(12) United States Patent
Sakai et al.

(10) Patent No.: US 7,333,518 B2
(45) Date of Patent: Feb. 19, 2008

(54) TRANSMISSION METHOD AND TRANSMISSION SYSTEM AS WELL AS COMMUNICATIONS DEVICE

(75) Inventors: Koji Sakai, Osaka (JP); Yuji Ichikawa, Tenri (JP); Masafumi Takahashi, Tenri (JP); Hitoshi Naoe, Nara (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 918 days.

(21) Appl. No.: 09/883,278

(22) Filed: Jun. 19, 2001

(65) Prior Publication Data

US 2002/0018492 A1 Feb. 14, 2002

(30) Foreign Application Priority Data

Jun. 19, 2000 (JP) .............................. 2000-182391
Apr. 25, 2001 (JP) .............................. 2001-128312

(51) Int. Cl.
*H04J 3/06* (2006.01)

(52) U.S. Cl. ...................... 370/516; 370/276; 714/739; 375/371; 398/79

(58) Field of Classification Search ................ 370/503, 370/514, 276, 282, 516; 398/67, 140, 79, 398/156; 375/354, 368, 377; 714/739, 744; 710/100, 106

See application file for complete search history.

(56) References Cited

U.S. PATENT DOCUMENTS

| | | | | |
|---|---|---|---|---|
| 4,813,040 A * | 3/1989 | Futato | .................. | 370/528 |
| 5,048,012 A * | 9/1991 | Gulick et al. | ................ | 370/498 |
| 6,169,746 B1 * | 1/2001 | Ueda et al. | ................ | 370/466 |
| 6,269,081 B1 * | 7/2001 | Chow et al. | ................ | 370/241 |
| 6,581,114 B1 * | 6/2003 | Sturm | ................. | 710/100 |
| 2002/0131125 A1 * | 9/2002 | Myers et al. | ............... | 359/161 |

FOREIGN PATENT DOCUMENTS

| | | |
|---|---|---|
| JP | 49-131007 | 12/1974 |
| JP | 58-083313 A | 5/1983 |
| JP | 59-214358 | 12/1984 |
| JP | 60-128752 | 9/1985 |
| JP | 61-158249 | 7/1986 |
| JP | 5-41697 | 2/1993 |
| JP | 6-197024 | 7/1994 |
| JP | A730523 | 1/1995 |
| JP | 8-204569 | 8/1996 |

(Continued)

OTHER PUBLICATIONS

Takizuka et al, OP i LINK, Dec. 4, 2000, (No. 784) pp. 167-176.

*Primary Examiner*—Duc Ho
(74) *Attorney, Agent, or Firm*—Birch, Stewart, Kolasch & Birch, LLP

(57) ABSTRACT

A transmission method according to the present invention is capable of transmitting and receiving a data signal and information signal among a plurality of devices by full-duplex operation, wherein, when the information signal consecutively repeats a single pattern, a different pattern is inserted between the same patterns before transmission thereof. This minimizes an adverse effect of crosstalk jitter over a transmission line susceptible to crosstalk, and reduces a margin between the transition and sampling point of a signal, thereby suppressing the cost of a CDR circuit.

18 Claims, 15 Drawing Sheets

FOREIGN PATENT DOCUMENTS

| | | |
|---|---|---|
| JP | 8-223047 | 8/1996 |
| JP | 9-162932 | 6/1997 |
| JP | 10-144007 A | 5/1998 |
| JP | 11-500887 | 1/1999 |
| JP | 11-177439 | 7/1999 |
| JP | 2000-504549 | 4/2000 |

\* cited by examiner

F I G. 1 3
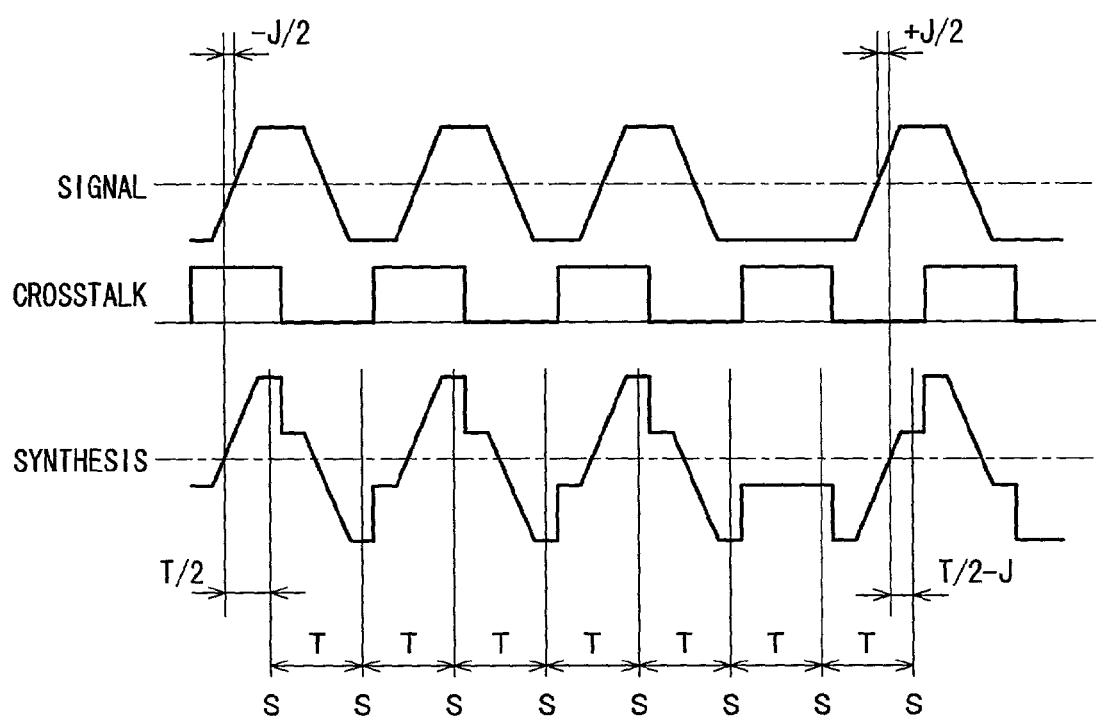

TRANSMISSION METHOD AND TRANSMISSION SYSTEM AS WELL AS COMMUNICATIONS DEVICE

FIELD OF THE INVENTION

The present invention relates to a transmission method and a transmission system as well as a communications device capable of transmitting and receiving a data signal and an information signal among a plurality of devices by full-duplex operation.

BACKGROUND OF THE INVENTION

As information devices have been digitized, high-speed serial communications utilizing digital signals have been adopted in a wide field which covers inter-LSI (large-scale integration) data transmission to wireless and optical-fiber telecommunications.

It is common in digital communications that a device on a side of the other party with whom data are communicated should transmit not only communication data but also timing information to enable accurate data sampling.

However, in order to reduce the number of lines to be used in communications, the high-speed serial communications for the most part avoid the use of an exclusive line for transmitting data containing timing information, other than a line to transmit serial data (communication data). Instead, in a serial data transmission system, in order to enable an input stage of a data receiving section thereof to accurately receive serial data which is transmitted via a transmission line, there is provided a clock data recovery (CDR) circuit which generates a clock of a constant period in synchronism with the serial data so as to correct (recover) a timing of the serial data based on the clock thus generated.

The CDR circuit is made up of a clock reproducing circuit for reproducing (generating) a clock from serial data, and a re-timing circuit for correcting a timing of the serial data based on the reproduced clock thus reproduced by the clock reproducing circuit so as to output it as re-timed data.

Meanwhile, an attempt to achieve bidirectional full-duplex operation based on a single wavelength by using, for example, a single optical fiber as a transmission line of a transmission system for the high-speed serial communications of digital signals raises various problems as shown below.

When two different controllers (hereinafter referred to as "nodes") which are connected by an optical fiber asynchronously transmit digital signals (light signals) to the optical fiber, respectively, either of the nodes is required to transmit a light signal while causing a LED or laser to emit light, and simultaneously receive a light signal from a node on the side of the other party by a photoreceptor (photodiode).

Namely, the same node is required to simultaneously perform light reception and light emission. An attempt to achieve this with one optical fiber results in light crosstalk such that transmission light is incident onto a light receiving element of the node on an outgoing side due to reflection at an end surface or the like of the optical fiber. The light crosstalk affects receiving light so as to cause system jitter. The system jitter thus caused by the light crosstalk (hereinafter simply referred to as "crosstalk") is referred to as "crosstalk jitter", thereby distinguishing it from the common system jitter.

Meanwhile, noise caused by the crosstalk exacerbates a bit error rate (BER) of data transmission.

The crosstalk jitter results from an offset of signal light due to the crosstalk. The following will explain a generation mechanism of the crosstalk jitter with reference to FIG. 12.

The waveform with a broken line in an upper half of FIG. 12 shows a light waveform in the absence of the crosstalk. This waveform diagram in the upper half of FIG. 12 shows that a slice level is set at the center of an amplitude of the signal light, and the crosstalk jitter does not occur, thereby preventing the center of a jitter distribution from deviating. In that case, as shown in FIG. 14, the jitter distribution is the one complying with a normal distribution.

In contrast, a waveform with a solid line in a lower half of FIG. 12 shows a light waveform in the presence of the crosstalk. The system jitter according to a crosstalk component (crosstalk jitter) occurs depending on a condition of the crosstalk component at the rise/fall of a signal.

More specifically, a waveform on the left side in the lower half of FIG. 12 shows a condition in which the crosstalk is "0", and a waveform on the right side in the lower half of FIG. 12 shows a condition in which the crosstalk is "1". Assuming that a slice level which determines whether a signal is "0" or "1" is set at the center of an amplitude of a received signal, the crosstalk raises the slice level only by a half amplitude of the crosstalk. As a result, the slice level deviates off the center of the amplitude of the light signal, thereby occurring the crosstalk jitter.

Further, in the case of the waveform on the left side in the lower half of FIG. 12, i.e., when the crosstalk is "0", a timing at which a signal rises across the slice level delays, and a timing at which the signal falls across the slice level becomes earlier.

Likewise, in the case of the waveform on the right side in the lower half of FIG. 12, i.e., when the crosstalk is "1", a timing at which a signal rises across the slice level becomes earlier, and a timing at which the signal falls across the slice level delays.

Since the crosstalk jitter occurs with this mechanism, it depends on a relationship between a pattern and a phase of the light signal and those of the crosstalk whether a condition in which the timings of the rise and fall are steadily displaced may occur, that may further effect a continuous one-way deviation in a data transition. In this respect, the crosstalk jitter is distinguished from the common system jitter.

Particularly, in a transmission system under the influence of the crosstalk, when a home port and a port of the other party have close clock speed, the continuous transmission of a periodic waveform (a single pattern) as a signal other than a data signal, for example a signal containing such status information as to indicate a connection condition between devices (hereinafter referred to as "information signal") from the both ports results in unbalanced jitter, thereby offering worse jitter tolerance (an indicator which shows to what extent jitter can be tolerated in a receiving system).

Here, as shown in FIG. 15, a jitter distribution under the influence of the crosstalk becomes either a jitter distribution (advanced jitter distribution) which is made up of a jitter component at an advanced stage of time or a jitter distribution (retarding jitter distribution) which is made up of a jitter component at a retarded stage of time.

Therefore, when a data pattern with which the deviation in the data transition thus continuing in a single direction persists, a center X of the original jitter distribution (eye) shifts, thereby locking the foregoing CDR circuit at a center Xa or Xl of the jitter distributions of the advanced or retarding jitter component, respectively.

Further, a switch from a late timing to an early timing, or an opposite switch may instantaneously occur. In that case, it is viewed as if large system jitter suddenly emerged in the CDR circuit.

When the one-way deviation in the transition of the crosstalk jitter distribution persists, the center of an apparent eye (the center of the jitter distribution) deviates off the center of the original eye, a signal sampling point by the CDR circuit deviates off the center of the original eye. When a deviation in a transition in an opposite direction thus occurs under such a condition that the sampling point deviated, the probability of erroneous data reception increases.

This phenomenon will be explained with reference to FIG. 13. Here, T is time per bit.

In FIG. 13, when a deviation persists in a transition in a forward direction of a signal, the CDR circuit sets a sampling point S after T/2 based on the deviated transition. This is the sampling deviation.

Here, when a deviation occurs in a retarding direction, a margin between a transition and a sampling point is (T/2)−J, where J is a size of the crosstalk jitter. On the other hand, when a deviation in the transition evenly occurs while there is no occurrence of a sampling deviation, the margin between the transition and sampling point is, as in the case of the common system jitter, (T/2)−(J/2). Namely, taking into consideration an unbalanced deviation in the transition, it is understood that the crosstalk jitter has an effect which is twice the effect of the common system jitter.

Thus, the crosstalk jitter in a transmission line which is susceptible to crosstalk is, for the CDR circuit, more problematic than the common system jitter because it requires the CDR circuit to improve performance. Therefore, there arises a problem such that the cost of the CDR circuit increases or, at worst, the CDR circuit cannot be attained at all.

SUMMARY OF THE INVENTION

It is an object of the present invention to provide a transmission method in which an adverse effect of crosstalk jitter in a transmission line susceptible to crosstalk is minimized so as to reduce a margin between the transition and sampling point of a signal, thereby suppressing the cost of a CDR circuit.

An example of a transmission system adopting the transmission method according to the present invention may be a transmission system capable of bidirectional full-duplex optical communications based on a single wavelength.

The present transmission system is applied to the transmission of a signal for conducting arbitration (arbitration for obtaining a license to use a bus) in IEEE Std 1394-1995 that is a standard set to perform a high-speed transmission of a large quantity of data among information devices such as computers and digital cameras, and arbitration in high-speed serial bus communications compliant with the arbitration in the IEEE Std 1394-1995.

Note that, the present invention is not limited to a transmission system pursuant to the foregoing standard, and, for example, it can be adopted in other serial transmission systems such as a USB (Universal Serial Bus). Moreover, it is applicable to wireless communications in addition to the optical-fiber communications.

In an arbitration period for the IEEE Std 1394-1995 and an arbitration period for the high-speed serial bus communications compliant therewith, devices communicate with each other by transmitting nine types of status information. Namely, there exist codes respectively representing nine types of status.

Here, one of the codes representing status information is an IDLE code which indicates a stand-by state. The IDLE code remains transmitted for a long period of time when there is no communication over a bus and the bus enters an idling state accordingly. In that case, when a home port and a port of the other party have close clock speed, the continuous transmission of a periodic waveform from the both ports results in unbalanced jitter, thereby offering worse jitter tolerance. The jitter tolerance is an indicator which shows to what extent jitter can be tolerated in a receiving system.

In the present invention, in order to prevent the worse jitter tolerance, improvements are made in a conventional system which consecutively transmits a single control code, and in order to reduce interaction between transmitting and receiving signals, a random data code is transmitted simultaneously with a control code.

Namely, in order to solve the foregoing problems, the transmission method according to the present invention capable of transmitting and receiving a data signal and an information signal among a plurality of devices by full-duplex operation has an arrangement in which, when the information signal consecutively repeats a single pattern, a different pattern is inserted between the same patterns before transmitting the single patterns.

In the transmission method according to the present invention, when the information signal consecutively repeats the single pattern, a different pattern is inserted between the same patterns before transmitting the information signal, thereby, when the information signal is transmitted via a transmission line, causing random variation of a signal level of crosstalk caused by the information signal.

This prevents the center of a jitter distribution under the effect of crosstalk from deviating off the center of the original jitter distribution. Here, the center of the jitter distribution, as shown in FIG. 15, comes to a position averaged from both peaks of retarding and advanced jitter components, that is, substantially the same position of a center X of the original jitter distribution.

Moreover, the center of the jitter distribution under the effect of crosstalk can be made closer to the center of the original jitter distribution. Therefore, even when affected by crosstalk due to the information signal, the center of the jitter distribution comes closer to the center of the original jitter distribution. Therefore, as shown in FIG. 15, required is a less margin between the transition and sampling point of a signal for accurate sampling of a signal, than a conventional margin which includes a whole jitter distribution including both retarding and advanced states when viewed from the original jitter distribution.

Consequently, a CDR circuit for making sampling of a signal can be manufactured at low cost.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 13 is a diagram showing a sampling point deviation.

DESCRIPTION OF THE EMBODIMENTS

A transmission method according to the present invention is the method for transmitting and receiving a data signal and an information signal among a plurality of devices by full-duplex communications. When transmitting the information signal, where the information signal is a signal having a single pattern which is continuously repeated, a different pattern is inserted between these single patterns before transmission. To be more specific, part of the signal having the continuously repeated single patterns is converted into a different pattern. This will be discussed later in detail.

Further, in the present embodiment, as an example of a transmission system, a transmission system capable of bidirectional full-duplex optical communications based on a single wavelength in which a single optical fiber is adopted as a transmission line will be explained.

The following will explain the transmission of a signal for conducting arbitration (arbitration for obtaining a license to use a bus) in IEEE Std 1394-1995 that is a standard set to perform a high-speed transmission of a large quantity of data among information devices such as computers and digital cameras, and arbitration in high-speed serial bus communications compliant with the arbitration in the IEEE Std 1394-1995.

Note that, the present invention is not limited to a transmission system pursuant to the foregoing standard, and, for example, it can be adopted in other serial transmission systems such as a USB (Universal Serial Bus). Moreover, it is applicable to wireless communications in addition to the optical-fiber communications.

In an arbitration period for the IEEE Std 1394-1995 and an arbitration period for the high-speed serial bus communications compliant therewith, devices communicate with each other by transmitting nine types of status information. Namely, there exist codes respectively representing nine types of status.

Here, one of the codes representing status information is an IDLE code which indicates a stand-by state. The IDLE code remains transmitted for a long period of time when there is no communication over a bus and the bus enters an idling state accordingly. In that case, when a home port and a port of the other party have close clock speed, the continuous transmission of a periodic waveform from the both ports results in unbalanced jitter, thereby offering worse jitter tolerance. The jitter tolerance is an indicator which shows to what extent jitter can be tolerated in a receiving system.

In the present invention, in order to prevent the worse jitter tolerance, improvements are made in a conventional system which consecutively transmits a single control code, and in order to reduce interaction between transmitting and receiving signals, a random data code is transmitted simultaneously with a control code.

Figure 6:
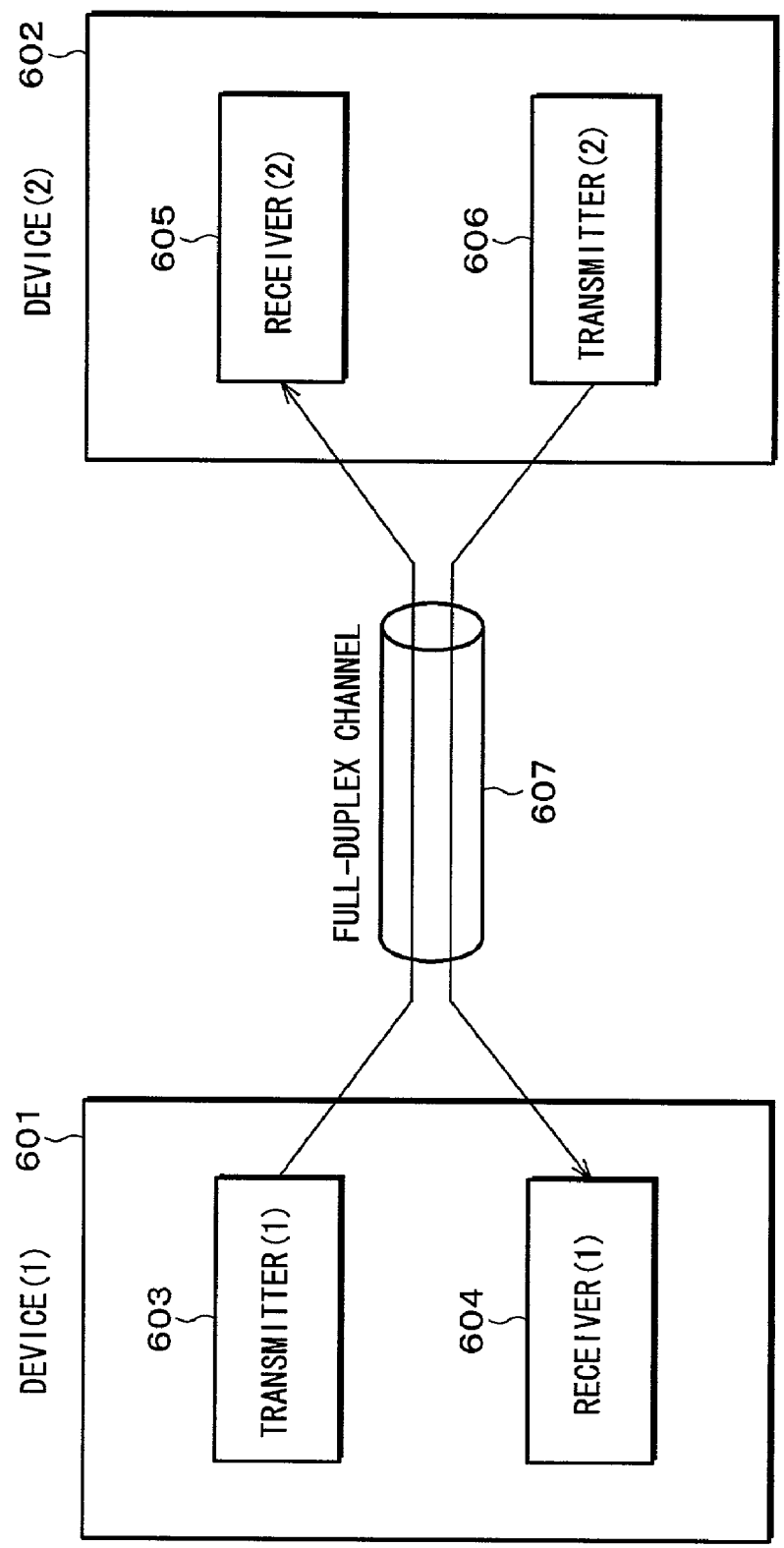
FIG. 6 is a diagram showing one embodiment in which two devices which are related to a transmission method and a transmission system according to the present invention are connected by a full-duplex channel.

The transmission system according to the present embodiment, as shown in FIG. 6 for example, has an arrangement in which a device (1) 601 composing a communicator is connected to a device (2) 602 composing a communicator at an end of the other party via a full-duplex channel 607 which is a transmission line made of one single optical fiber.

More specifically, in the foregoing communication system, the device (1) 601 is made up of a transmitter (1) 603 and a receiver (1) 604, and the device (2) 602 is made up of a transmitter (2) 605 and a receiver (2) 606, and the full duplex channel 607 connects therebetween.

Here, an attempt to attain bidirectional full-duplex operation based on a single wavelength by adopting a single optical fiber causes crosstalk to adversely affect reception light, the crosstalk being such that reflection of transmission light at, for example, an end surface of an optical fiber causes the transmission light to be incident onto a photoreceptor of a home node. The crosstalk causes system jitter, and it depends on a relationship between a pattern and a phase of the signal light and those of the crosstalk whether a condition in which the timings of the rise and fall are steadily displaced may occur, that may further effect a continuous one-way deviation in a data transition.

The detailed explanation of transmitters and receivers of respective devices according to the present invention which are attained in order to solve the foregoing problem will be provided in each embodiment shown below. Note that, the present invention is not limited to the use between two devices, and as shown in FIG. 7, it is applicable among a plurality of devices, for example, in the case of wireless communications.

Figure 7:
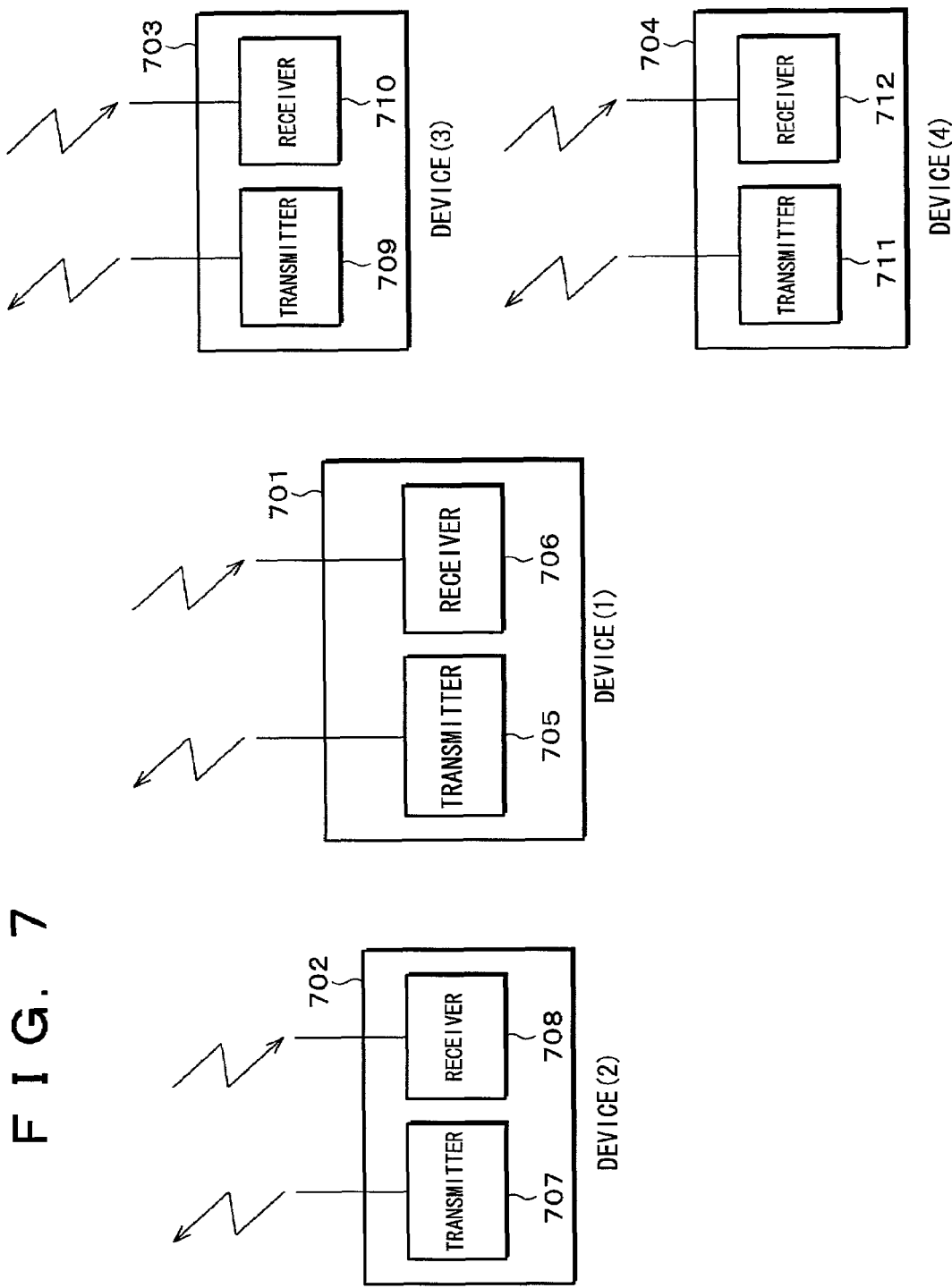
FIG. 7 is a diagram showing one embodiment in which a plurality of devices which are related to the transmission method and transmission system according to the present invention are connected by the full-duplex channel.

FIG. 7 shows an example of the use of four devices in the wireless communications, where a device (1) 701 is made up of a transmitter 705 and a receiver 706, a device (2) 702 is made up of a transmitter 707 and a receiver 708, a device (3) 703 is made up of a transmitter 709 and a receiver 710, and a device (4) 704 is made up of a transmitter 11 and a receiver 712.

With the foregoing as preconditions, a transmission method and a transmission system as well as a communications device according to the present invention will be described in detail in each embodiment below.

First Embodiment

Figure 1:
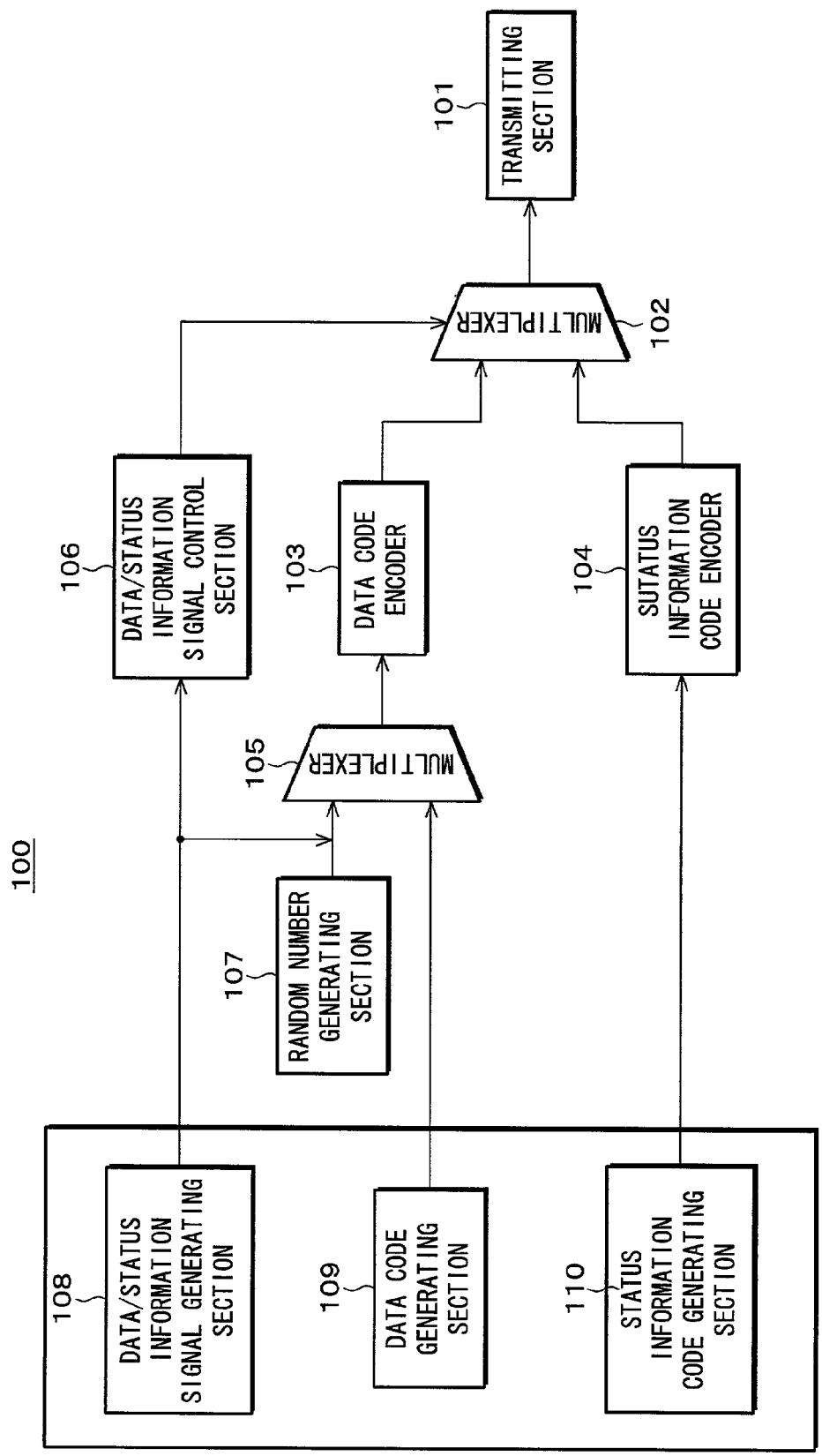
FIG. 1 is a diagram showing a transmitter according to a First Embodiment of the present invention.
Figure 2:
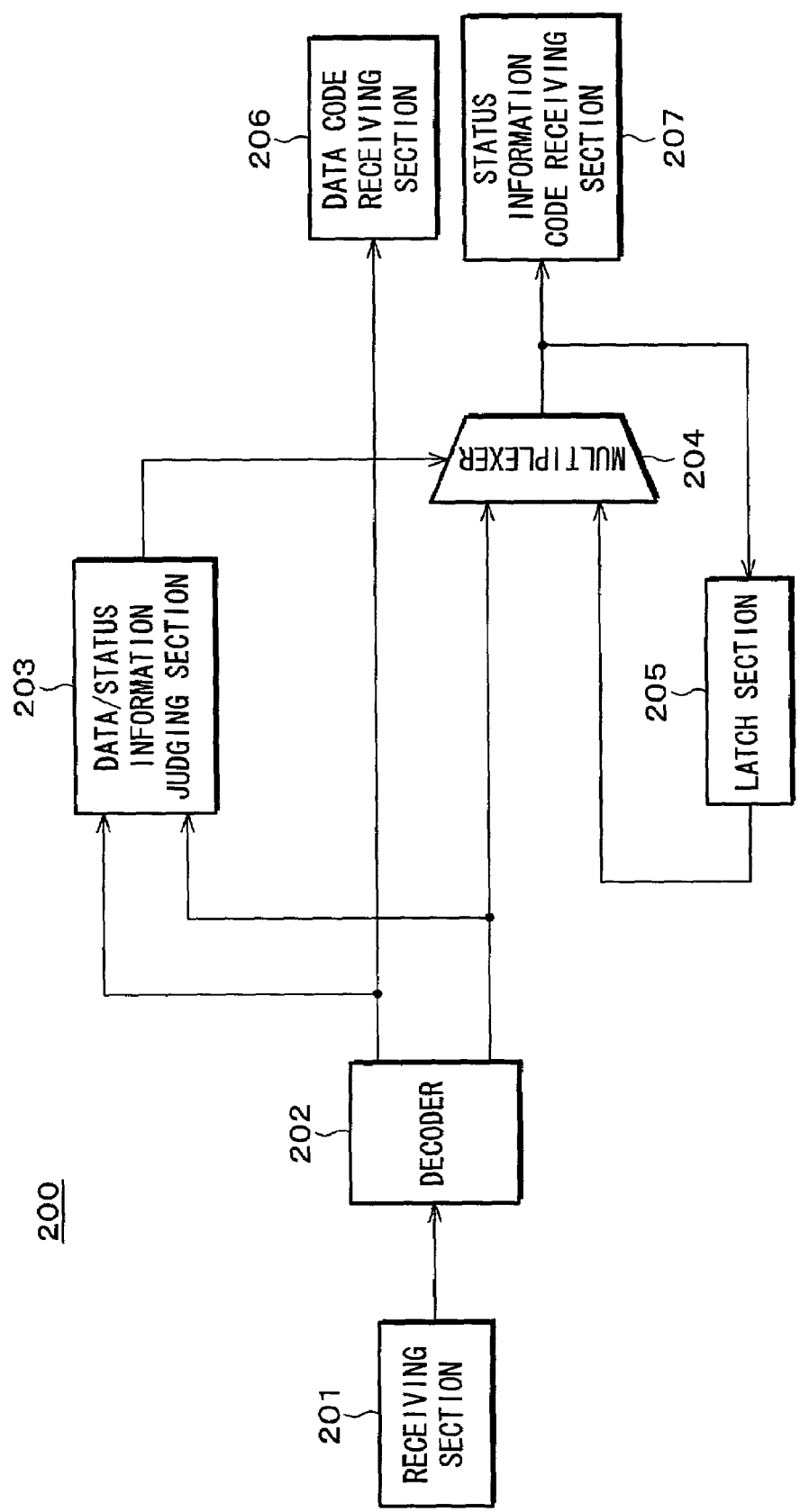
FIG. 2 is a diagram showing a receiver according to the First Embodiment of the present invention.

The following will describe a communications device according to a First Embodiment of the present invention with reference to FIGS. 1 and 2.

The communications device includes a transmitter 100 shown in FIG. 1 and a receiver 200 shown in FIG. 2.

The transmitter 100, as shown in FIG. 1, includes a transmitting section 101, a multiplexer 102, a data code encoder 103, a status information code encoder 104, a multiplexer 105, a data/status information signal control section 106, a random number generating section 107, a data/status information signal generating section 108, a data code generating section 109, and a status information code generating section 110.

The following will explain respective functions of blocks composing the transmitter 100.

The transmitting section 101 is a section to transmit one bit each of a data code or status information code received from the multiplexer 102, in accordance with a constant clock.

The multiplexer 102 is a section to switch output of a code to the transmitting section 101, between a data code and a status information code, judging from a control signal from the data/status information signal control section 106.

The data code encoder 103 and status information code encoder 104 are sections to perform encoding in some manner.

The multiplexer 105 is a section to switch output of a code to the data code encoder 103, between a data code from the data code generating section 109 and a random code generated from the random number generating section 107, judging from a data/status information signal outputted from the data/status information signal generating section 108.

The data/status information signal control section 106 is a section to generate a control signal to be outputted to the multiplexer 102 based on a data/status information signal from the data/status information signal generating section 108.

The random number generating section 107 is a section to generate a random code.

The data/status information signal generating section 108 is a section to generate a data/status information signal which indicates whether a currently transmitted code is a data code or a status information code.

The data code generating section 109 is a section to generate a data code.

The status information code generating section 110 is a section to generate a status information code.

Here, judging from a signal outputted from the data/status information signal generating section 108, should it on one hand be in a time period to transmit a data code, the multiplexer 105 outputs a data code from the data code generating section 109 to the data code encoder 103, and should it on the other hand be a time period to transmit a status information code, the multiplexer 105 outputs a random code from the random number generating section 107 to the data code encoder 103.

Meanwhile, a control signal to be generated in the data/status information signal control section 106 is generated based on a data/status information signal which indicates whether a currently transmitted code from the data/status information signal generating section 108 is a data code or a status information code, and the control signal thus generated is outputted to the multiplexer 102.

More specifically, when the data/status information signal indicates that the currently transmitted code is a data code, the data/status information signal control section 106 outputs a control signal so that the multiplexer 102 outputs a code (data code) to be outputted from the data code encoder 103, to the transmitting section 101.

On the other hand, when the data/status information signal indicates that the currently transmitted code is a status information code which repeats a single pattern, the data/status information signal control section 106 outputs such a control signal as to control output of a code from the multiplexer 102 to the transmitting section 101, the code being selected from a code (status information code) outputted from the status information code encoder 104 to the multiplexer 102 and a code (random code) outputted from the data code encoder 103 to the multiplexer 102, by a random or regular switch.

Further, when the data/status information signal indicates that the currently transmitted code is a status information code which does not repeat a single pattern, the data/status information signal control section 106 outputs such a control signal as to control that the multiplexer 102 outputs only a code (status information code) from the status information code encoder 104, to the transmitting section 101.

When the data/status information signal indicates that the currently transmitted code is a status information code which repeats a single pattern, and when the multiplexer 102 randomly switches output of a code between the code (status information code) from the status information code encoder 104 and the code (random code) from the data code encoder 103, the data/status information signal control section 106 is enabled by the random number generating section provided therein to switch data/status information signals at a random interval and output the selected data/status information signal to the multiplexer 102.

Thus, the switch of output from the multiplexer 102 at a random interval prevents transmission of a continuously repeated single pattern.

Meanwhile, when the data/status information signal indicates that the currently transmitted code is a status information code which repeats a single pattern, and when the multiplexer 102 regularly switches, i.e., switches at a fixed interval, output of a code between the code (status information code) from the status information code encoder 104 and the code (random code) from the data code encoder 103, the data/status information signal control section 106 is enabled by a counter provided therein to switch data/status information signals at a specific counter value and output the selected data/status information signal to the multiplexer 102.

Thus, even when converting a pattern to be transmitted at a fixed interval, there can be attained the same effect as in the case of switching output from the multiplexer 102 at a random interval.

Further, the receiver 200 that is a component of the communications device according to the present embodiment, as shown in FIG. 2, includes a receiving section 201, a decoder 202, a data/status information judging section 203, a multiplexer 204, a latch section 205, a data code receiving section 206, and a status information code receiving section 207.

The following will explain respective functions of blocks composing the receiver 200.

The receiving section 201 is a section to transmit to the decoder 202, one bit each of data transmitted by a transmitter of a communications device of the other party, as received.

The decoder 202 is a circuit to decode a signal subject to encoding in some manner and is a section to restore data from a received code to the original state and output it to the data/status information judging section 203, the multiplexer 204 and the data code receiving section 206.

The data/status information judging section 203 is a section to judge as to whether a code outputted from the decoder 202 is a data code or a status information code, and output a judging signal resulted therefrom to the multiplexer 204.

The multiplexer 204 is a section to switch, based on the judging signal from the data/status information judging section 203, between output of a status information code from the decoder 202 to the status information code receiving section 207, and output of a status information code held in the latch section 205.

The latch section 205 is a section to hold a status information code outputted from the multiplexer 204.

The data code receiving section 206 is a section to receive a data code outputted from the decoder 202.

The status information code receiving section 207 is a section to receive a status information code outputted from the multiplexer 204.

Hereinafter explanation will be made on the precondition that the receiver 200 is a device having means for drawing a distinction between a time period to receive a code representing data and a time period to receive a code representing status information, and a code currently received is not a data code.

The data/status information judging section 203 judges as to whether a code received from the decoder 202 is a data code or a status information code, and outputs a signal indicative of a result of the judgment to the multiplexer 204.

When the signal indicative of the result of the judgment indicates a status information code, the multiplexer 204 outputs a status information code received from the decoder 202. On the other hand, when it is a data code which is indicated, then a time period is presently the one to receive a status information code, thereby outputting a status information code which was previously received and is held in the latch section 205.

This arrangement thus explained causes no troubles by reception of a data code during a time period to receive a status information code, because the data code receiving section 206 neglects the inputted data code for the reason that it is not the time to receive the data code, thereby preventing input of the data code to the status information code receiving section 207.

Consequently, realizing the communications device according to the First Embodiment allows a crosstalk light level to vary at random at the time of transition of a signal, thereby preventing, or suppressing, that a sampling point at which a CDR circuit makes sampling of a signal deviates off the center of the original eye.

This enables sampling of a data code made at a proper sampling point, thereby reducing the probability of erroneous data reception.

Meanwhile, a transmission method of the communications device according to the foregoing arrangement has a sort of scrambling effect, and therefore it is effective as a countermeasure against EMI (electromagnetic interference). A conventional scrambling technique requires synchronization for scrambling between communications devices, that is not required in the present invention.

Furthermore, the present invention is capable of limiting patterns to be outputted, thereby preventing unexpectedly long lasting output of, for example, "0" or "1".

Further, a data encoder for encoding a data signal can also be used as a pattern generator for generating different patterns.

Further, when inserting a pattern to be transmitted at a fixed interval, since the interval of the transmission of the pattern to be transmitted is thus fixed, a device at a receiving end can check the pattern to be transmitted at this interval.

Figure 8:
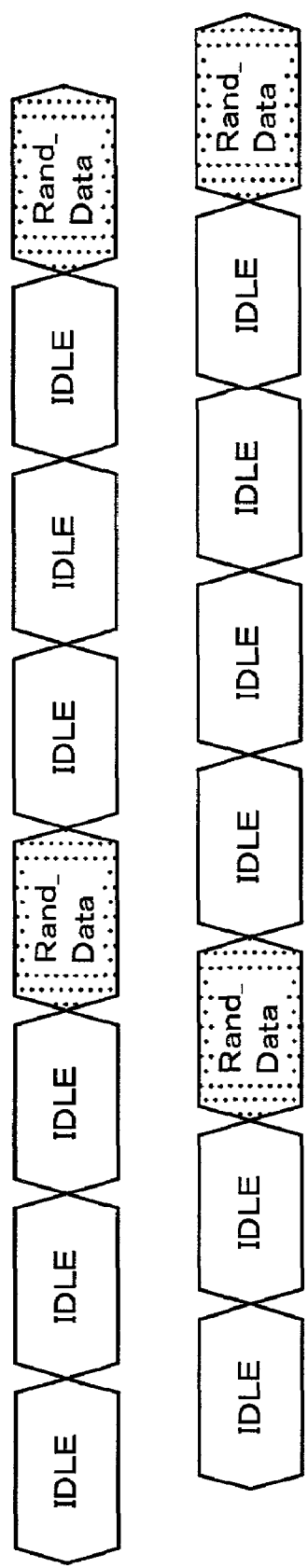
FIG. 8 is an explanatory view showing one example of a transmission pattern of a transmission method according to the First Embodiment of the present invention and is a diagram showing a case where a pattern is inserted at a random interval.

The following will explain one example of the transmission patterns in the transmission method according to the First Embodiment of the present invention with reference to FIG. 8.

A transmission pattern as shown in FIG. 8 shows a case where a pattern is inserted at a random interval. Here, assuming that transmission patterns IDLE and Rand_Data (random data) are respectively abbreviated to I and R, the transmission pattern of FIG. 8 can be given with these symbols as -[III]-R-[III]-R-[II]-R-[IIII]-R-. This indicates that R is inserted at a random interval such that the number of I becomes 3, 3, 2, then 4. Note that, in the present embodiment, R is inserted at a random interval only with respect to a single pattern; however, the present invention is not limited to this.

Figure 9:
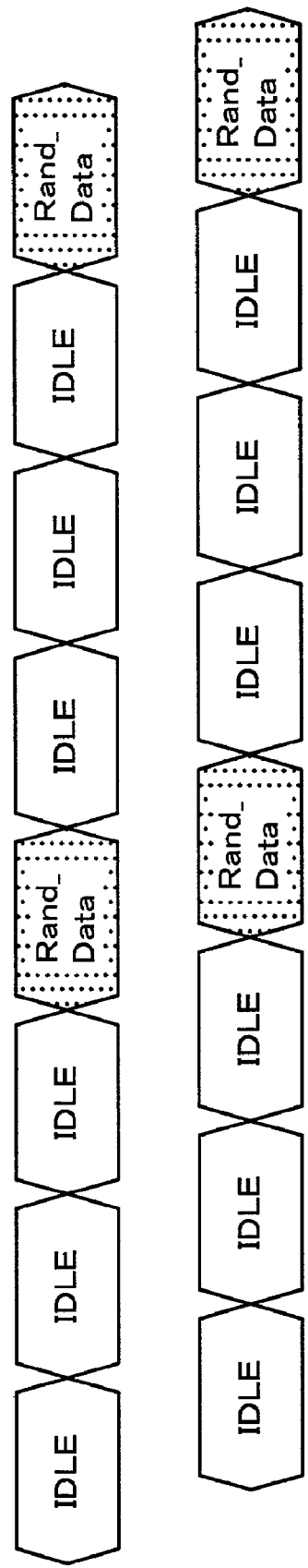
FIG. 9 is an explanatory view showing one example of the transmission pattern of the transmission method according to the First Embodiment of the present invention and is a diagram showing a case where a pattern is inserted at a fixed interval.

The following will explain another example of the transmission patterns in the transmission method according to the First Embodiment of the present invention with reference to FIG. 9.

A transmission pattern as shown in FIG. 9 shows a case where a pattern is inserted at a fixed interval. Here, assuming that transmission patterns IDLE and Rand_Data (random data) are respectively abbreviated to I and R, the transmission pattern of FIG. 9 can be given with these symbols as -[III]-R-[III]-R-[III]-R-[III]-R-. This indicates that R is inserted at a fixed interval such that the number of I becomes 3, 3, 3, then 3. Note that, in the present embodiment, R is inserted at a fixed interval with respect to a single pattern; however, the present invention is not limited to this.

Note that, in the present embodiment, explanation of a pattern to repeat a single pattern has been made with an IDLE code indicating a stand-by state as an example, though not limited to this. Likewise, any information signals including a control code for the use in a transmission system adopting an optical fiber can be used if transmitted after inserting a random data code between the single patterns, thereby reducing an adverse effect of crosstalk and preventing deviation in a jitter distribution.

An optical transmission system such as "OP i. LINK (registered trademark)" have the following control codes as shown in Table 1.

TABLE 1

The List of Control Codes

| Control Code |
| --- |
| PREABLE |
| P_IDLE |
| S_TPBIAS_DISABLE |
| S_IDLE |
| P_TPBIAS_DISABLE |
| REQUEST |
| GRANT |
| PARENT_NOTIFY |

TABLE 1-continued

The List of Control Codes

Control Code

HIGHER_SPEED
DATA_PREFIX
CHILD_NOTIFY
IDENT_DONE
KEEP_SPEED
DATA_END
SPEED200
SPEED400
BUS_RESET
SYNC_CHARACTER
END_NEGOTIATION
SUSPEND
DISABLE_NOTIFY

Among the control codes shown in Table 1, when the control codes except DATA_RREFIX, DATA_END, SPEED200 and SPEED400 are transmitted, they are transmitted after inserting random data codes between the control codes. Note that, it goes without saying that the present invention is applicable to any other systems having a control code which consecutively repeats a single pattern.

Second Embodiment

The following will explain a Second Embodiment of the present invention.

With respect to the transmitter 100 of FIG. 1 that is the First Embodiment, in the present Second Embodiment is added a function such that when a single pattern to be transmitted is changed into a pattern indicative of other information at a timing to transmit random data, a transmission pattern (pattern indicative of other information) after the change is transmitted without inserting random data. This will be explained below.

Figure 3:
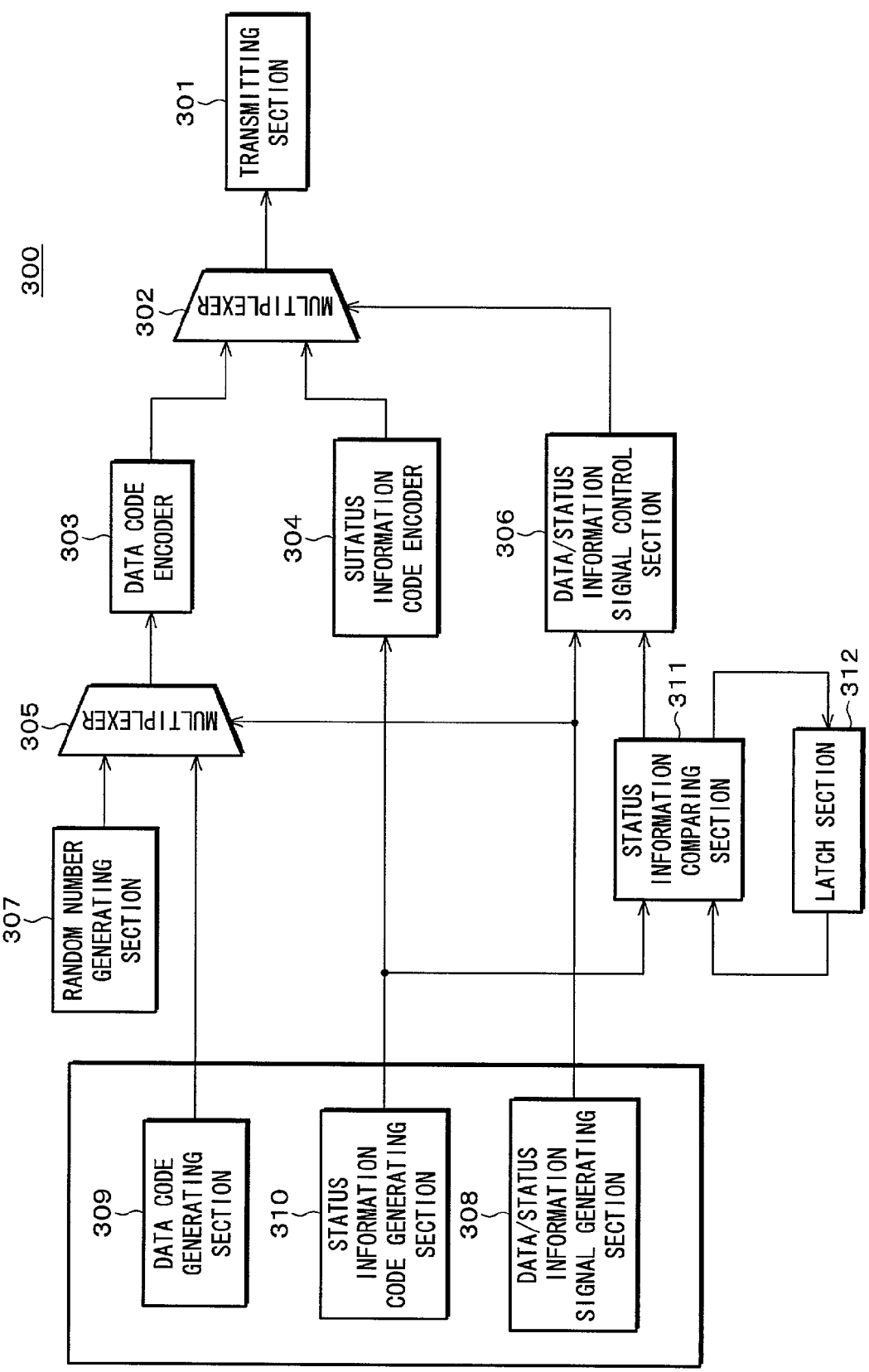
FIG. 3 is a diagram showing a transmitter according to a Second Embodiment of the present invention.

In FIG. 3, a transmitter 300 includes a transmitting section 301, a multiplexer 302, a data code encoder 303, a status information code encoder 304, a multiplexer 305, a data/status information signal control section 306, a random number generating section 307, a data/status information signal generating section 308, a data code generating section 309, a status information code generating section 310, a status information comparing section 311 and a latch section 312.

The following will explain respective functions of blocks composing the transmitter 300, provided that explanation of the blocks having the same functions as with the First Embodiment, i.e., the blocks except the data/status information signal control section 306, the status information comparing section 311 and the latch section 312, will be omitted here.

Based on a data/status information signal from the data/status information signal generating section 308 and a status information comparing signal from the status information comparing section 311, the data/status information signal control section 306 generates a control signal to be outputted to the multiplexer 302.

The status information comparing section 311 makes a comparison between a status information code which is outputted from the status information code generating section 310 and a status information code which was previously received and is outputted from the latch section 312, so as to generate a comparison result signal to be outputted to the data/status information signal control section 306. Further, the status information comparing section 311 outputs a status information code received from the status information code generating section 310 intact to the latch section 312.

The latch section 312 holds a status information code which is outputted from the status information comparing section 311.

Here, when, judging from a signal indicative of a comparison result outputted from the status information comparing section 311, the previously received status information code and the currently transmitted status information code are different, the data/status information signal control section 306 outputs a control signal to the multiplexer 302 so that the multiplexer 302 transmits the status information code intact even when there comes a timing to insert a data code.

Thus, a problem seen in the First Embodiment such that transmission is delayed because, regardless of whether or not a status information code is changed, a data code is inserted at every timing to do so without transmitting a status information code can be solved by additionally providing the circuits of the present Second Embodiment.

Figure 10:
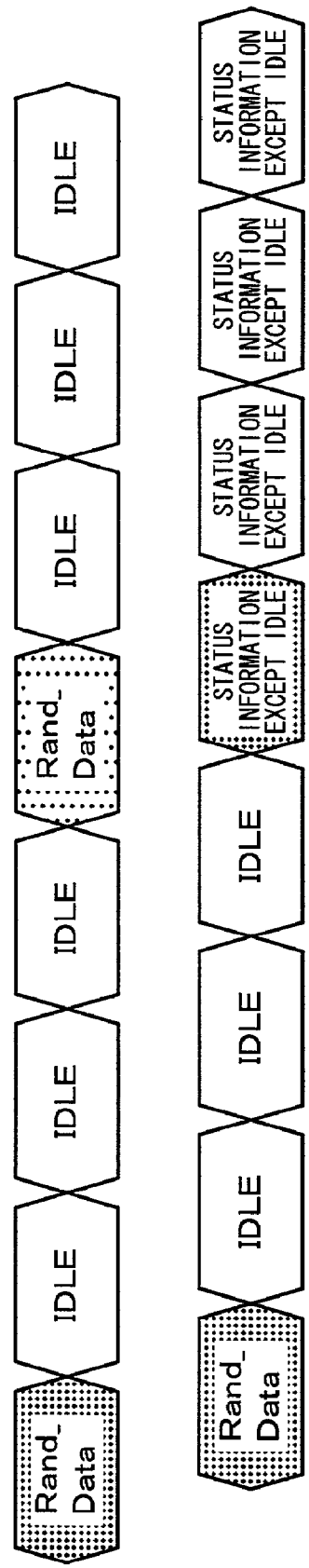
FIG. 10 is an explanatory view showing one example of a transmission pattern of a transmission method according to the Second Embodiment of the present invention.

FIG. 10 is an explanatory diagram showing one example of a transmission pattern in the transmission method according to the present Second Embodiment. Here, assuming that transmission patterns Rand_Data (random data), IDLE and status information except IDLE are respectively abbreviated to R, I and S, a transmission pattern as shown in FIG. 10 can be given with these symbols as R-III-R-III-R-III-R-III-(SSSS)-.

This may otherwise be given as R-III-R-III-R-III-(R-SSS)-. Nevertheless, when a pattern to be transmitted is changed, by the transmission method according to the present Second Embodiment is transmitted a pattern as changed, without inserting a random pattern even at a timing to do so. Therefore, as shown in FIG. 10, a part of the pattern becomes -(SSSS)-, but not -(R-SSS)-.

Third Embodiment

The following will explain a Third Embodiment of the present invention.

The transmission method and transmission system according to the present invention are to transmit and receive a data signal and an information signal among a plurality of devices by full-duplex operation, wherein a coding method for preparing two types of codes which are respectively made up of reverse "1" and "0" with respect to some information of a single type and selecting a code from two types of tables in accordance with an internal parameter is used for the information signal to cause random variation of the internal parameter so as to transmit a code. As an example of the foregoing transmission method and system, an application thereof to an 8B10B encoding system will be described in the present Third Embodiment.

The 8B10B encoding system is such that 8-bit data representing signal information is converted into 10-bit data so as to be transmitted to a transmission line. Digital data which is dealt with under the present transmission system is converted at a transmitting end, for example, from 8-bit data in which 1 code includes 8 bits into 10-bit data in which 1 code includes 10 bits, that is called an 8-10 bits conversion, and transmitted as 10-bit data.

Thereafter, at a receiving end, the original 8 bit-data is restored from the received 10-bit data by a 10-8 bits conversion. Thus, 10-bit data used in a transmission system includes various codes respectively having the following three different types of 10-bit structures: (i) 10 bits consisting of more "1" than "0"; (ii) 10 bits consisting of more "0" than "1"; and (iii) 10 bits equally consisting of "1" and "0".

Here, in order to indicate the state of each number "1" or "0" is adopted a concept called Running Disparity (RD). According to this, in the case of the above type (i), it is considered that the Running Disparity (RD) is 'positive', and in the case of the above type (ii), the RD is 'negative', and further, in the case of the above type (iii), the RD is 'neutral'.

In addition, a code of the above type (i), a code of the above type (ii) and a code of the above type (iii) are respectively referred to as a "code of the positive RD", a "code of the negative RD" and a "code of the neutral RD". Each individual information is given two codes, provided that some information may be given two identical codes.

Further, in the selection of 10-bit data, when a code provided immediately before is of the negative RD, a code of the positive or neutral RD is selected, and when a code provided immediately before is of the positive RD, a code of the negative or neutral RD is selected.

Here, as an example of an IDLE code to indicate a stand-by state, "0011111010" of the positive RD and "1100000101" of the negative RD will be discussed.

When CRD (Current Running Disparity) which is the RD of a code provided immediately before is negative (−), an IDLE code "0011111010" of the positive RD is selected, and when the CRD which is the RD of a code provided immediately before is positive (+), then an IDLE code "1100000101" of the negative RD is selected. Hereinafter, the above "0011111010" and "1100000101" are respectively referred to as "+IDLE code" and "−IDLE code".

Here, with respect to each signal at the transmitting end is inserted, for example, either of the +IDLE code of the positive RD and the −IDLE code of the negative RD, depending on whether a code provided immediately before is of the negative or positive RD. For example, in the case where a code is inserted at the transmitting end, when the code provided immediately before is of the negative RD, the positive +IDLE code is inserted, and when the code provided immediately before is of the positive RD, the negative −IDLE code is inserted.

Figure 4:
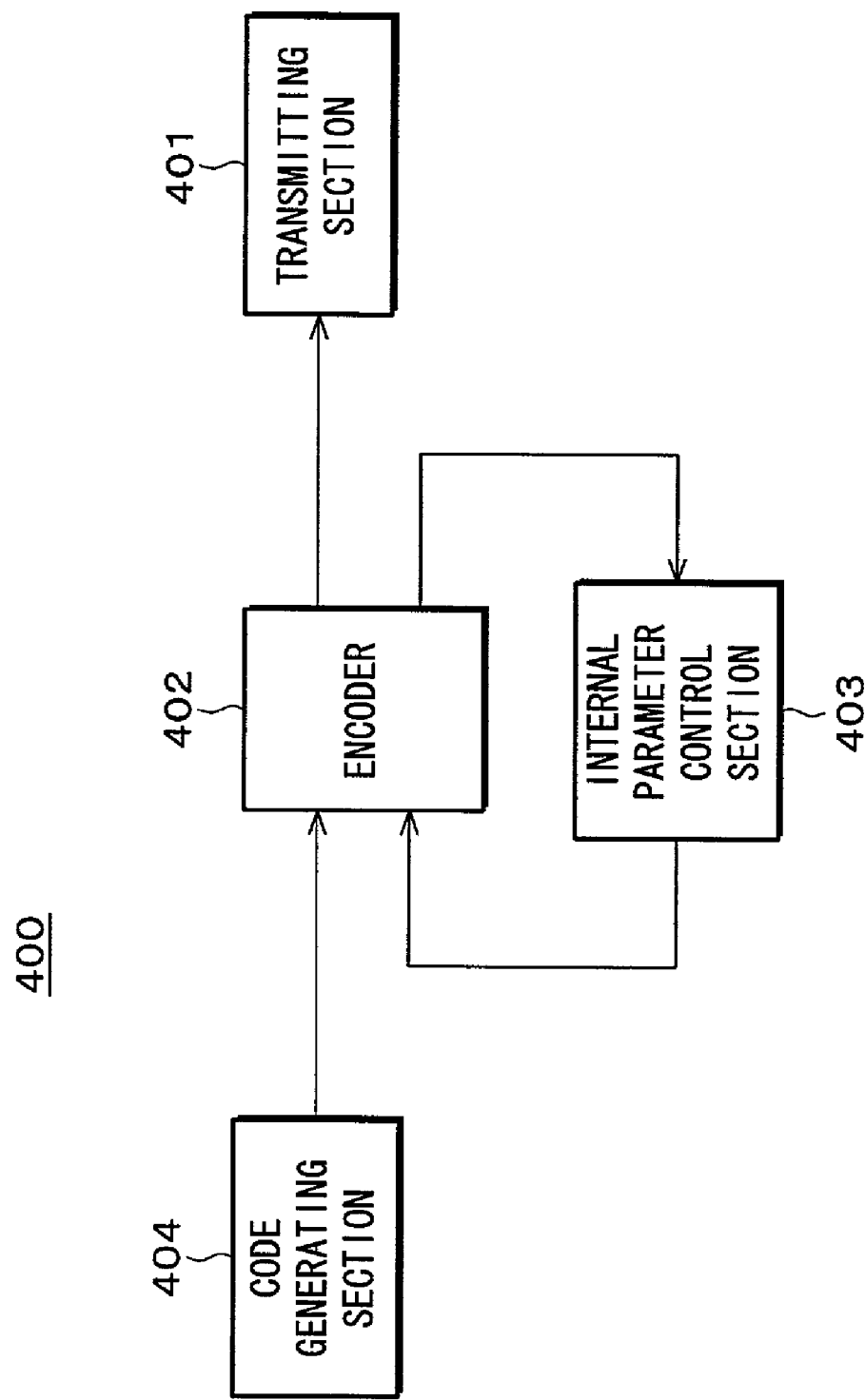
FIG. 4 is a diagram showing a transmitter according to a Third Embodiment of the present invention.

FIG. 4 shows the Third Embodiment of the present invention which is a transmitter to realize the foregoing transmission method and system. In FIG. 4, a transmitter 400 includes a transmitting section 401, an encoder 402, an internal parameter control section 403 and a code generating section 404.

The following will explain respective functions of blocks composing the transmitter 400.

The transmitting section 401 transmits one bit each of a code transmitted from the encoder 402, according to a constant clock.

The encoder 402 encodes a code received from the code generating section 404 by the 8B10B encoding.

The internal parameter control section 403 causes random variation of an internal parameter generated in the encoder 402.

The code generating section 404 generates a code and outputs it to the encoder 402.

Note that, as to the internal parameter control section 403, in the case of a common 8B10B encoding on one hand, when consecutively transmitting IDLE patterns, an internal parameter RD alternately varies between positive and negative. In the case of the present Third Embodiment on the other hand, providing a random number generator within the internal parameter control section 403 causes random variation of an internal parameter, thereby preventing the consecutive repeated transmission of a single pattern. Here, as a method for controlling an internal parameter, three methods for changing an internal parameter at a different timing will be explained.

First of all, a first method is to allow an internal parameter to vary every time at random. This method provides a simple circuit but reduces an effect of RD. As a second method can be adopted a method to allow an internal parameter to vary periodically. By providing a counter within the internal parameter control section 403, for example, causes random variation of an internal parameter at a specified counter value. The present method provides the effect of RD and is most preferable in terms of mounting. Further, such a third method that allows an internal parameter to vary in a random period may be adopted.

According to the present Third Embodiment, it is possible to randomly change crosstalk light level at the transition of a signal, thereby preventing, or suppressing, that a sampling point at which a CDR circuit makes sampling of a signal deviates off the center of the original eye.

Further, the present Third Embodiment offers a sort of scrambling effect, and therefore it is effective as a countermeasure against EMI. A conventional scrambling technique requires synchronization for scrambling between communications devices, that is not required in the present invention.

Further, the function of table selection that is required for coding can be diverted, thereby reducing a circuit scale. Moreover, a code representing a stand-by state, which is likely to remain transmitted consecutively for a long period of time, can be transmitted securely.

Figure 11:
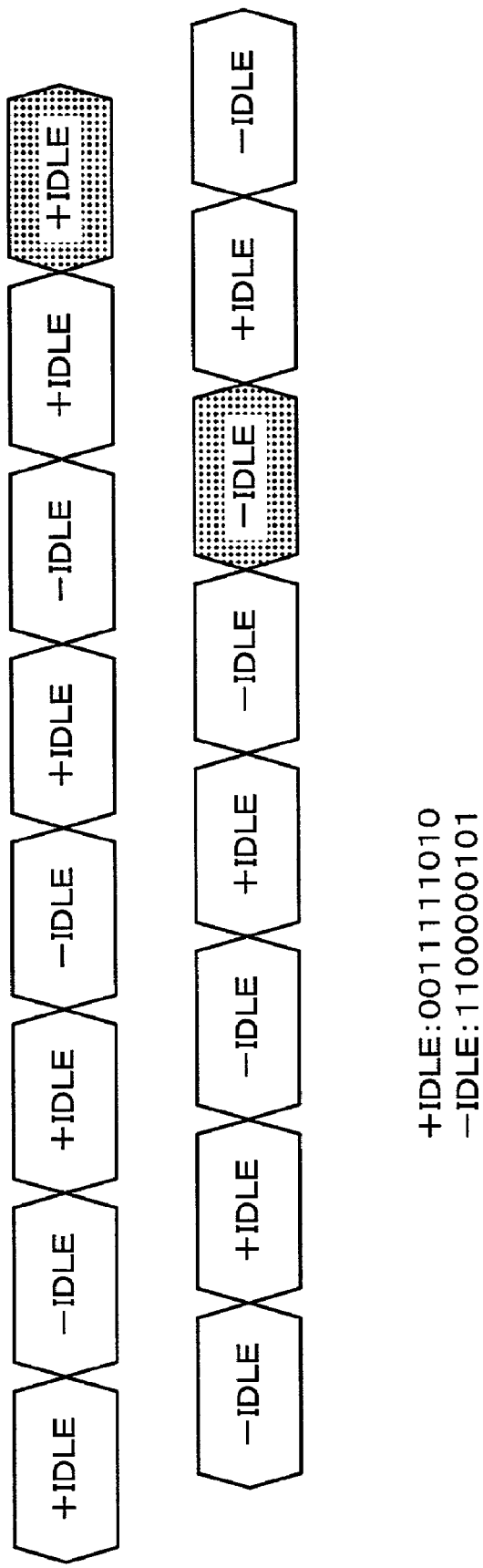
FIG. 11 is an explanatory view showing one example of a transmission pattern of a transmission method according to the Third Embodiment of the present invention.
Figure 12:
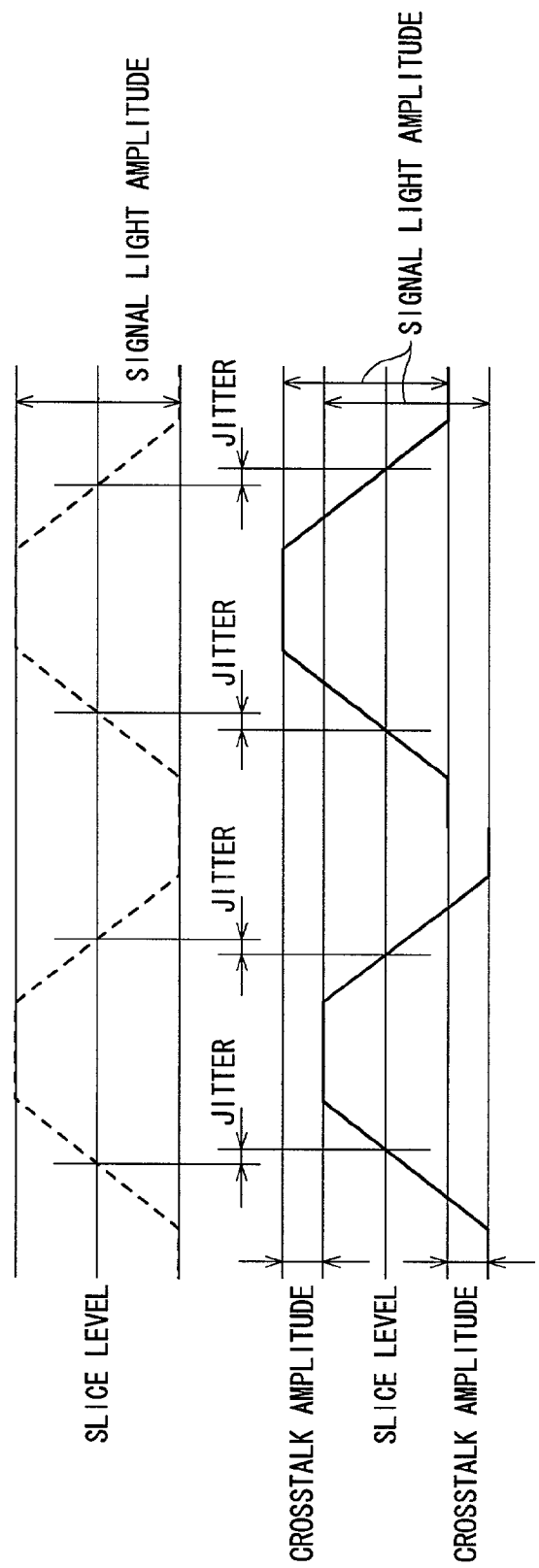
FIG. 12 is a diagram showing a generation mechanism of crosstalk jitter.
Figure 14:
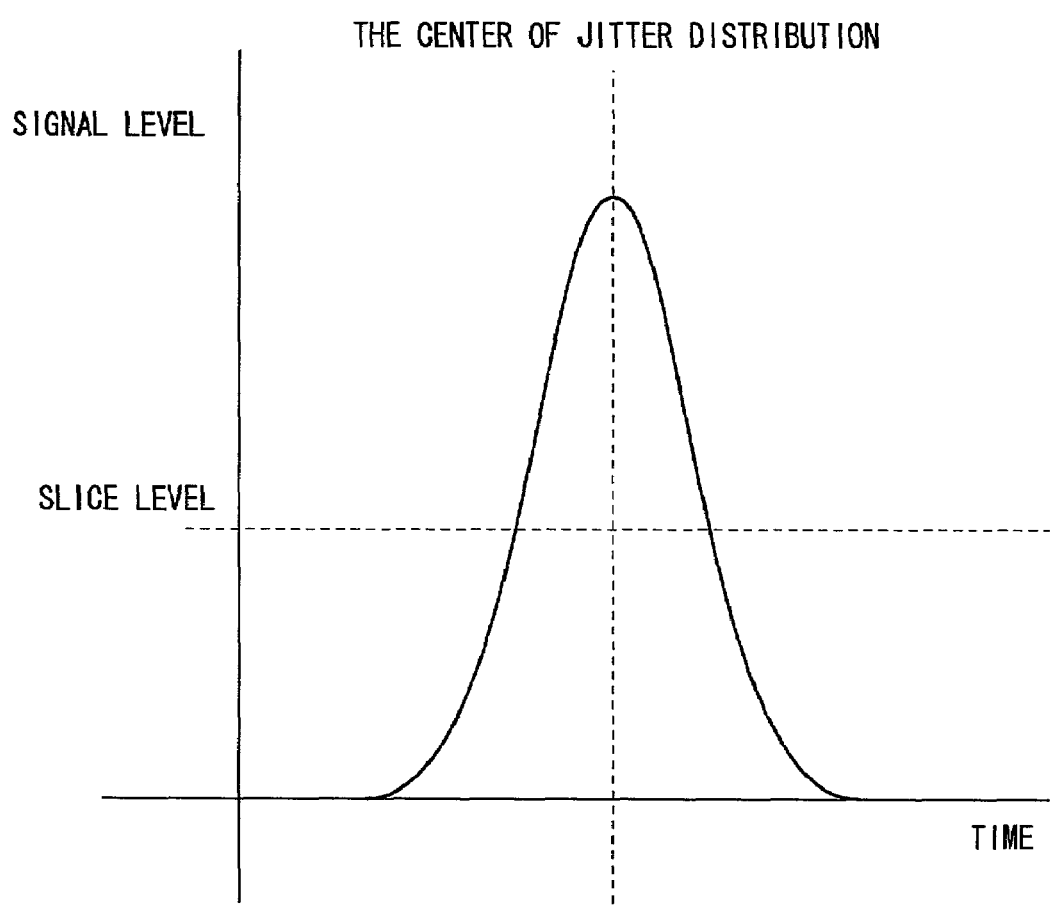
FIG. 14 is a graph showing a jitter distribution free from an influence of crosstalk.
Figure 15:
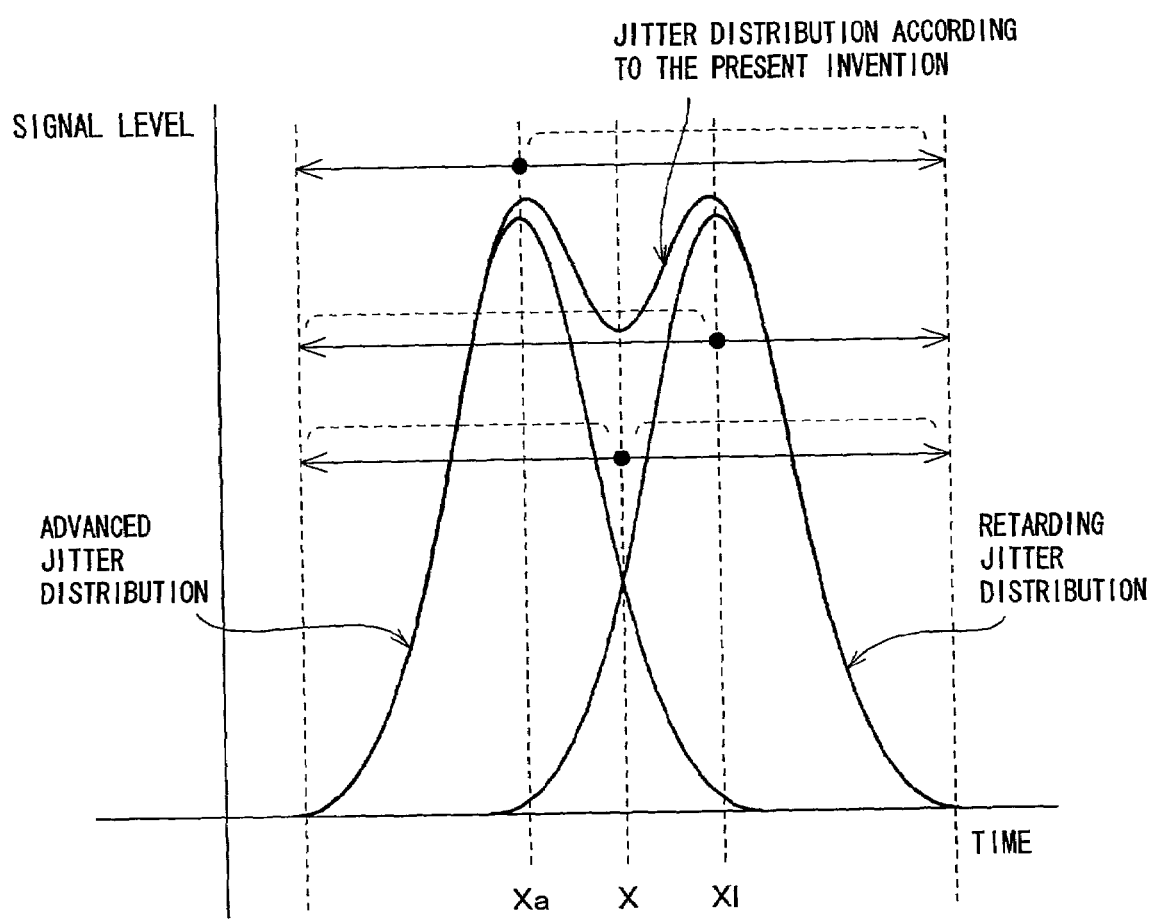
FIG. 15 is a graph showing a jitter distribution under the influence of crosstalk.

FIG. 11 is an explanatory diagram showing one example of a transmission pattern in the transmission method according to the Third Embodiment. Here, assuming that transmission patterns +IDLE and −IDLE are respectively abbreviated to +1 and −1, FIG. 11 can be given with these symbols as (+1) (−1) (+1) (−1) (+1) (−1) (+1) (+1*) (−1) (+1) (−1) (+1) (−1) (−1*) (+1) (−1). A portion marked with an asterisk will have conversion and insertion.

Fourth Embodiment

The following will explain a Fourth Embodiment according to the present invention.

Figure 5:
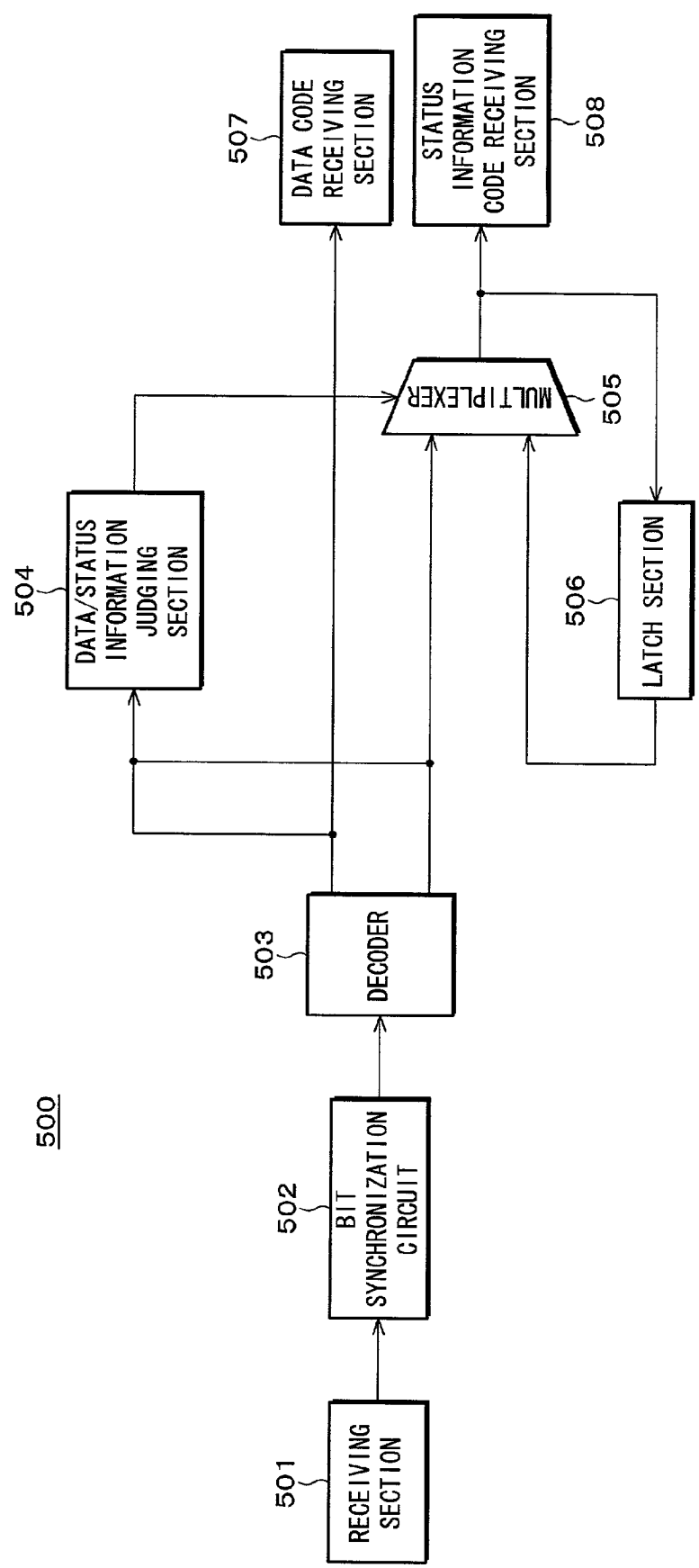
FIG. 5 is a diagram showing a receiver according to a Fourth Embodiment of the present invention.

FIG. 5 is referred to to explain the Fourth Embodiment of the present invention. In the Fourth Embodiment, in the receiver 200 according to the First Embodiment above, in order to accurately receive serial data which is transmitted, there is provided a bit synchronization circuit which generates a clock of a constant period in synchronism with the serial data so as to correct (recover) a timing of the serial data based on the clock thus generated.

In FIG. 5, a receiver 500 includes a receiving section 501, a bit synchronization circuit 502, a decoder 503, a data/status information judging section 504, a multiplexer 505, a latch section 506, a data code receiving section 507 and a status information code receiving section 508. Respective functions of blocks composing the receiver 500 will be explained, provided that explanation of the blocks except the bit synchronization circuit 502 having the functions as explained referring to FIG. 2 of the First Embodiment will be omitted here.

The bit synchronization circuit 502 outputs a bit string which was received by the receiving section 501 to the decoder 503 in synchronism with an internal clock.

The present invention is capable of random variation of a crosstalk light level at the transition of a signal, thereby preventing, or suppressing, that a sampling point at which a CDR circuit makes sampling of a signal deviates off the center of the original eye.

Further, the present embodiment offers a sort of scrambling effect, and therefore it is effective as a countermeasure against EMI. A conventional scrambling technique requires synchronization for scrambling between communications devices, that is not required in the present invention. Moreover, the stable output of a clock synchronizing a receiving signal, and data is available.

As discussed, a transmission method according to the present invention capable of transmitting and receiving a data signal and an information signal among a plurality of devices by full-duplex operation has an arrangement in which, in the case where the information signal consecutively repeats a single pattern, a pattern different from the single pattern is inserted before transmitting the single pattern.

Therefore, in the case where the information signal consecutively repeats a single pattern, transmitting the information signal by inserting a different pattern between the same patterns can cause random variation of a signal level of crosstalk which is generated from the information signal while the information signal is transmitted through a transmission line.

This prevents a center of a jitter distribution under the effect of crosstalk from deviating off the center of the original jitter distribution.

Moreover, the center of the jitter distribution under the effect of crosstalk can be made closer to the center of the original jitter distribution. Therefore, even when affected by crosstalk due to an information signal, the center of a jitter distribution is made closer to the center of the original jitter distribution, thereby requiring a less margin between the transition and sampling point of a signal for the accurate sampling of a signal, than a conventional margin which includes a whole jitter distribution including both retarding and advanced states when viewed from the original jitter distribution.

Consequently, a CDR circuit for making sampling of a signal can be manufactured at low cost.

Further, the outputting and reception of a data signal and an information signal may be performed among the plurality of devices, and particularly between two devices.

With this arrangement, it is possible to perform bidirectional full-duplex operation based on a single waveform by adopting a single optical fiber as a transmission line. Here, also, it is prevented that a system jitter due to crosstalk adversely affects reception light, the crosstalk being caused by, for example, reflection of transmission light at an end surface of the optical fiber.

Further, the aforesaid different pattern may be inserted between the same patterns at a random interval.

With this arrangement, a signal level of crosstalk at the transition of a signal can be caused to vary at random, thereby preventing, or suppressing, that a sampling point at which a CDR circuit makes sampling of a signal deviates off the center of the original jitter distribution (eye).

Further, the aforesaid different pattern may alternatively be inserted between the same patterns at a fixed interval.

With this arrangement, since an interval between the transmission of a pattern is fixed, a device at a receiving end can check a pattern to be transmitted at this interval.

Further, as the aforesaid different pattern, it is possible to adopt a pattern which is randomly selected from a group of patterns including a plurality of different patterns.

With this arrangement, it is possible to limit a pattern to be outputted, thereby preventing unexpectedly long lasting output of, for example, "0" or "1".

Further, the aforesaid single pattern may be a code representing status information indicative of a state between devices.

With this arrangement, the present invention is applicable to the transmission of an arbitration signal in the IEEE 1394 and an arbitration signal in high-speed serial bus communications and the like compliant therewith.

Further, the aforesaid different pattern may be a code different from the code representing status information.

With this arrangement, as with the above arrangement, the present invention is applicable to the transmission of an arbitration signal in the IEEE 1394 and an arbitration signal in high-speed serial bus communications and the like compliant therewith.

Further, as the aforesaid code representing status information, a code indicating a stand-by state may be used.

With this arrangement, the code indicating a stand-by state which is likely to remain transmitted consecutively for a long period of time can be transmitted securely.

Further, it may be arranged such that a time period for receiving a code representing data of the aforesaid data signal and a time period for receiving a code representing status information of an information signal are distinguished from each other based on a reception signal, and the code representing data may be adopted as a different code in a time period for transmitting the code representing status information.

With this arrangement, a data encoder for encoding a data signal can also be used as a pattern generator for generating different patterns.

Further, it may be arranged such that, when a different code is received in the time period for receiving the code representing status information, the previously received code representing status information is maintained.

With this arrangement, in a section of a device at a receiving end for referring to status information can be performed such a treatment that the insertion of a different pattern is suspended.

Further, as the aforesaid code, a code in compliance with the 8B10B encoding system may be adopted.

With this arrangement, the DC balance and maximum run length of a signal can be secured.

Moreover, in the case where the 8B10B encoding system is adopted for the aforesaid code, advantages over the use of other encoding systems are offered as explained below.

The other encoding systems include a 4B5B encoding system which is adopted, for example, by Ethernet (100 Base-Tx, 100 Base-FX) of 100 Mbps. The 4B5B encoding system, in comparison with the 8B10B encoding system, has an inferior DC balance. More specifically, the 4B5B encoding system, on one hand, has a DC balance of 40% to 60%, where a variation like this results in instability, and the 8B10B encoding system, on the other hand, has a stable DC balance of substantially 50%.

Further, the other encoding systems include a Manchester encoding system which is used, for example, by Ethernet of 10 Mbps. In the Manchester encoding system, in order to represent "1", a voltage first becomes high, and is transitioned to a low voltage after a half period, whereas when representing "0", a voltage first becomes low, and is transitioned to a high voltage after a half period.

Accordingly, in the Manchester encoding system, since two different voltages are thus required to represent one bit, a transmission frequency band which is twice that of a transmitting signal (for example, a frequency of 20 MHz when transmitting 10 Mbits/sec) is required. On the other hand, in the 8B10B encoding system, required is a transmission frequency band which is only 1.25 times that of the transmitting signal (for example, a frequency of 12.5 MHz when transmitting 10 Mbits/sec).

Furthermore, the other encoding systems include NRZ and NRZI encoding systems. In the case of transmitting, for example, the encoded 8-bit data, the NRZ and NRZI encoding systems and the Manchester encoding system convert the 8-bit data into a 8-bit code. However, the 8B10B encoding system converts the 8-bit data into a 10-bit code.

Thus, in the 8B10B encoding system, it is possible to secure new codes (2-bit codes) which remain unused in data transmission, thereby making it possible to utilize the unused codes as control codes to respectively indicate a transmission/reception stand-by state, start/end of data transmission, and the like.

Further, in the 8B10B encoding system, the maximum run length is 5. Therefore, it is possible at a receiving end to reproduce a clock by a CDR circuit. Here, having the maximum run length of 5 means that "0" or "1" within data consecutively continues only up to 5 at the maximum.

Meanwhile, in the case where a single pattern to be consecutively repeated in transmission is changed into a pattern indicative of other information at the same transmission timing as with the aforesaid different pattern, the pattern indicative of other information may be transmitted.

With this arrangement, when a status information code is changed at a timing to insert a data code, the status information code is transmitted intact, thereby occurring no delay in transmission.

Further, in order to solve the foregoing problems, a transmission method according to the present invention, capable of transmitting and receiving a data signal and an information signal among a plurality of devices by full-duplex operation, has an arrangement in which, when two different types of codes respectively made up of reverse "1" and "0" correspond to a single type of information contained in the information signal, and one of the two types of codes is selected and transmitted in accordance with an internal parameter, the internal parameter is caused to vary at random before transmitting the code.

With this arrangement, when the information signal consecutively repeats a single pattern in transmission, two types of codes having different polarities and the single pattern are transmitted at random. Therefore, a random signal level of crosstalk generated in a transmission line is attained, thereby preventing one-way deviation in a jitter distribution due to occurrence of crosstalk.

Further, there is adopted a coding method in which two types of codes respectively having reverse "1" and "0" correspond to one information, and a code is selected from two types of tables in accordance with an internal parameter, thereby diverting thereto a table selection function which is required for coding, and reducing a circuit scale.

Further, it may be arranged such that variation points of a reception signal are detected so as to generate a clock to synchronize the reception signal based on an average interval between the variation points, and the data or information signal is received based on the clock thus generated.

With this arrangement, it is possible to stably outputs the clock synchronizing the reception signal, and data.

Further, a transmission system capable of transmitting and receiving a data signal and an information signal among a plurality of devices by full-duplex operation adopts the foregoing transmission method.

Further, a transmission method according to the present invention is also adopted in the following communications device.

More specifically, a communications device capable of transmitting and receiving a data signal and an information signal among a plurality of devices by full-duplex communication includes: a transmitter for transmitting the data and information signals; and a receiver for receiving the data and information signals, wherein: the transmitter includes a random pattern generating section for randomly generating a pattern different from the information signal, an identification signal generating section for generating an identification signal which indicates whether a signal to be transmitted is the data signal or the information signal, and a transmitting section for transmitting the data or information signal based on the identification signal, and the transmitting section, when the identification signal is the information signal and consecutively repeats a single pattern, transmits the information signal after inserting a random pattern generated by the random pattern generating section into the information signal.

With this arrangement, when the information signal consecutively repeats a single pattern, a different pattern is inserted between the same patterns before transmitting the information signal, thereby, when the information signal is transmitted through a transmission line, causing random variation of a signal level of crosstalk generated by the information signal.

This prevents, or suppress, that the center of a jitter distribution under the effect of crosstalk deviates off the center of the original jitter distribution.

Moreover, the center of the jitter distribution under the effect of crosstalk can be made closer to the center of the original jitter distribution. Therefore, even when affected by crosstalk due to the information signal, the center of a jitter distribution can be made closer to the original jitter distribution. This requires a less margin between transition and sampling point of a signal for accurate sampling of a signal, than a conventional margin which includes a whole jitter distribution including both retarding and advanced states when viewed from the original jitter distribution.

Consequently, a CDR circuit for making sampling of a signal can be manufactured at low cost.

The aforesaid receiver may include a signal judging section for judging whether a reception signal is the data signal or the information signal, and a setting section for setting a time period for receiving the data signal and a time period for receiving the information signal in accordance with a result of judgment by the signal judging section.

With this arrangement, the receiver can make a distinction between the time period for receiving the data signal and the time period for receiving the information signal, thereby solving a problem such that the data signal is received in the time period for receiving the information signal.

Further, the receiver may include a bit synchronization circuit for detecting variation points of a reception signal and generating a clock to synchronize the reception signal based on an average interval between the variation points.

With this arrangement, it is possible to stably output the clock synchronizing the reception signal, and data.

Meanwhile, a transmission method according to the present invention may be described in the following manner.

Namely, a transmission method according to the present invention capable of transmitting and receiving a data signal and an information signal among a plurality of devices by full-duplex operation may have an arrangement in which the information signal has a plurality of single patterns to be consecutively repeated in transmission and different patterns.

The transmission method according to the present invention is capable of communication among a plurality of devices via a transmission line susceptible to crosstalk, wherein, when a pattern is repeated in transmission, the repeated patterns are partially replaced with a different pattern.

Accordingly, in the transmission line susceptible to crosstalk, a crosstalk light level can be changed at random at the transition of a signal, thereby preventing a sampling point at which a CDR circuit makes sampling of a signal from deviating off the center of the original eye. In addition, the transmission method according to the present invention offers a sort of scrambling effect, and therefore it is effective as a countermeasure against EMI. A conventional scrambling technique requires synchronization for scrambling between communications devices, that is not required in the present invention.

Further, in the transmission method according to the present invention, the aforesaid plurality of devices are two devices.

Therefore, even in the case of bidirectional full-duplex operation based on a single wavelength which adopts a single optical fiber as a transmission line, for example, it is possible to prevent an adverse effect of system jitter due to crosstalk which is caused by, for example, reflection of transmission light at an end surface of the optical fiber.

Meanwhile, in a transmission method according to the present invention, the patterns are replaced at a random interval.

Accordingly, a crosstalk light level can be changed at random at the transition of a signal, thereby preventing a sampling point at which a CDR circuit makes sampling of a signal from deviating off the center of the original eye.

Alternatively, in a transmission method according to the present invention, the patterns are replaced at a fixed interval.

Accordingly, since an interval between the transmission of patterns to be transmitted is fixed, a device at a receiving end can check a pattern to be transmitted at this interval.

Further, in a transmission method according to the present invention, a pattern to be replaced at random or fixed interval is randomly selected from a group of different patterns.

Accordingly, a pattern to be outputted can be limited, thereby preventing unexpectedly long lasting output of "0" or "1".

Further, in a transmission method according to the present invention, a pattern with periodicity which is the aforesaid repeated pattern is a code representing status information.

Accordingly, the present invention is applicable to the transmission of an arbitration signal in the IEEE 1394 and an arbitration signal in high-speed serial bus communications and the like compliant therewith.

Further, in a transmission method according to the present invention, a pattern to be replaced with the code representing status information is a code which is not included in the code representing status information.

Accordingly, as explained, the present invention is applicable to the transmission of an arbitration signal in the IEEE 1394 and an arbitration signal in high-speed serial bus communications and the like compliant therewith.

Further, in a transmission method according to the present invention, a device at a receiving end has means for making a distinction between a time period for receiving a code representing data and a time period for receiving status information, and the code representing data is used as a code which is not included in the code representing status information in the time period for receiving the code representing status information.

Accordingly, it is possible to use a data encoder as a generator of a pattern to be replaced.

Further, in a transmission method according to the present invention, the code representing status information is a code indicative of a stand-by state.

Accordingly, it is possible to securely transmit the code indicative of a stand-by state which is likely to remain transmitted for a long period of time.

Further, in a transmission method according to the present invention, when a code other than the code representing status information is received, a previously received code representing status information is maintained.

Accordingly, in a section of a device at a receiving end for referring to status information can be performed such a treatment that the replacement of patterns is suspended.

Further, in a transmission method according to the present invention, a code to be transmitted is a code in compliance with an 8B10B encoding system.

Accordingly, the DC balance and maximum run length of a signal can be secured.

Further, in a transmission method according to the present invention, when the aforesaid pattern to be transmitted is changed, the pattern is transmitted without replacement.

Accordingly, when a status information code is changed at a timing to insert a data code, the status information code is transmitted intact, thereby occurring no delay in transmission.

Further, in a transmission method according to the present invention capable of communication among a plurality of devices via a transmission line susceptible to crosstalk, there is adopted a coding method in which two types of codes respectively having reverse "1" and "0" correspond to one information, and a code is selected from two types of tables in accordance with an internal parameter, and the code is transmitted by causing random variation of the internal parameter.

Accordingly, in the transmission line susceptible to crosstalk, it is possible to divert thereto a table selection function which is required for coding, thereby reducing a circuit scale.

Further, a transmission method according to the present invention includes a bit synchronization circuit for detecting variation points of a reception signal and generating a clock to synchronize the reception signal based on an average internal between the variation points.

Accordingly, it is possible to stably output the clock synchronizing the reception signal, and data.

Further, a transmission method according to the present invention capable of communication among a plurality of devices via a transmission line susceptible to crosstalk includes a function to communicate, when a pattern is repeated in transmission, the repeated patterns are partially replaced with a different pattern.

Accordingly, it is possible to attain a transmission system capable of random variation of a crosstalk light level at the transition of a signal via the transmission line susceptible to crosstalk, and preventing a sampling point at which a CDR circuit makes sampling of a signal from deviating off the center of the original eye.

Further, a transmission method according to the present invention includes a bit synchronization circuit for detecting variation points of a reception signal and generating a clock to synchronize the reception signal based on an average interval between the variation points, thereby stably outputting the clock synchronizing the reception signal, and data.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A transmission method for transmitting and receiving a data waveform signal and a periodic information waveform signal among a plurality of devices by full duplex operation, comprising:
   detecting variation points in a reception signal;
   generating a clock to synchronize the reception signal based on an average interval between the detected variation points in the reception signal;
   receiving the data waveform or information waveform signal based on the clock thus generated;
   inserting, when the information waveform signal consecutively repeats a single pattern, a different pattern between the repeated single patterns before transmitting the repeated single patterns; and
   transmitting said repeated single patterns having the inserted different pattern between the repeated single patterns.

2. The method as set forth in claim 1, wherein the plurality of devices refer to two devices.

3. The method as set forth in claim 1, wherein the different pattern is inserted between the single patterns at a random interval.

4. The method as set forth in claim 1, wherein the different pattern is inserted between the single patterns at a fixed interval.

5. The method as set forth in claim 1, wherein the different pattern is a pattern which is randomly selected from a group consisting of a plurality of different patterns.

6. The method as set forth in claim 1, wherein the single pattern is a code representing status information indicative of a state between devices.

7. The method as set forth in claim 6, wherein the different pattern is a code different from the code representing status information.

8. The method as set forth in claim 7, wherein a time period for receiving a code representing data of the data signal and a time period for receiving a code representing status information of the information waveform signal are distinguished from each other based on a reception signal, and the code representing data is adopted as a different code in a time period for transmitting the code representing status information.

9. The method as set forth in claim 7, wherein, when a different code is received in the time period for receiving the code representing status information, a previously received code representing status information is maintained.

10. The method as set forth in claim 6, wherein the code representing status information is a code indicative of a stand by state.

11. The method as set forth in claim 6, wherein the code is a code in compliance with an 8B10B encoding system.

12. The method as set forth in claim 1, wherein, when the single pattern to be consecutively repeated in transmission is changed into a pattern representing other information at the same transmission timing as with the different pattern, the pattern representing other information is transmitted.

13. The method as set forth in claim 1, wherein the transmission method utilizes an optical signal.

14. A transmission method for transmitting and receiving a data waveform signal and a periodic information waveform signal among a plurality of devices by full duplex operation, wherein two different types of codes respectively including reverse "1" and "0" correspond to a single type of information contained in the information waveform signal, comprising:
   detecting variation points of a reception signal;
   generating a clock to synchronize the reception signal based on an average interval between the variation points;
   receiving a data waveform or information waveform signal based on the clock signal thus generated;
   randomly varying an internal parameter form a list of control codes;
   selecting one of the two types of codes; and
   transmitting said selected one type of code in accordance with the internal parameter.

15. The method as set forth in claim 14, wherein the transmission method utilizes an optical signal.

16. A transmission system transmitting and receiving a data waveform signal and a periodic information waveform signal among a plurality of devices by full duplex operation, comprising:
   a receiver detecting variation points of a reception signal, generating a clock to synchronize the reception signal based on an average interval between the variation points, and receiving the data waveform or information waveform signal based on the clock thus generated; and
   a transmitter for transmitting a signal such that, when the information waveform signal consecutively repeats a single pattern, a different pattern is inserted between the repeated single patterns before transmitting the single patterns and the repeated single patterns having the inserted different pattern are transmitted.

17. A communications device transmitting and receiving a data waveform signal and ana periodic information waveform signal among a plurality of devices by full duplex operation, comprising:
   a transmitter for transmitting the data waveform and information waveform signals; and
   a receiver for receiving the data waveform and information waveform signals,
   wherein:
   the transmitter includes a random pattern generating section for randomly generating a pattern different from the information waveform signal, an identification signal generating section for generating an identification signal which indicates whether a signal to be transmitted is the data waveform signal or the information waveform signal, and a transmitting section for transmitting the data waveform or information waveform signal based on the identification signal, and
   the transmitting section, when the identification signal is the information waveform signal and consecutively repeats a single pattern, transmits the information waveform signal after inserting a random pattern generated by the random pattern generating section into the information waveform signal,
   wherein the receiver includes a bit synchronization circuit for detecting variation points of a reception signal and generating a clock to synchronize the reception signal based on an average interval between the variation points.

18. The communications device as set forth in claim 17, wherein the receiver includes a signal judging section for judging whether a reception signal is the data waveform signal or the information waveform signal, and a setting section for setting a time period for receiving the data waveform signal and a time period for receiving the information waveform signal, in accordance with a result of judgment by the signal judging section.

* * * * *